United States Patent
Lei

(10) Patent No.: US 11,742,991 B2
(45) Date of Patent: Aug. 29, 2023

(54) INDICATION FOR HARQ-ACK FEEDBACK

(71) Applicant: Motorola Mobility LLC, Chicago, IL (US)

(72) Inventor: Haipeng Lei, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 16 days.

(21) Appl. No.: 16/496,624

(22) PCT Filed: Mar. 23, 2017

(86) PCT No.: PCT/CN2017/077839
§ 371 (c)(1),
(2) Date: Sep. 23, 2019

(87) PCT Pub. No.: WO2018/170823
PCT Pub. Date: Sep. 27, 2018

(65) Prior Publication Data
US 2020/0374043 A1  Nov. 26, 2020

(51) Int. Cl.
*H04W 48/12* (2009.01)
*H04L 1/1812* (2023.01)
(Continued)

(52) U.S. Cl.
CPC .......... *H04L 1/1819* (2013.01); *H04L 1/1812* (2013.01); *H04L 1/1858* (2013.01);
(Continued)

(58) Field of Classification Search
CPC ... H04L 1/0027; H04L 1/1812; H04L 1/1819; H04L 1/1854; H04L 1/1896;
(Continued)

(56) References Cited

U.S. PATENT DOCUMENTS 5,357,525 A * 10/1994 Moriue ............... H04L 25/4902
370/360
10,785,791 B1 * 9/2020 Eyuboglu ............. H04L 1/1887
(Continued)

FOREIGN PATENT DOCUMENTS

| CN | 101291199 A | 10/2008 | |
| CN | 108464049 B * | 1/2021 | ........... H04L 1/1607 |
| WO | 2013143453 A1 | 10/2013 | |

OTHER PUBLICATIONS

Performance improvement for multichannel HARQ protocol in next generation WiMAX system, Tao et al., IEEE Xplore (Year: 2008).*
(Continued)

*Primary Examiner* — Salvador E Rivas
(74) *Attorney, Agent, or Firm* — Kunzler Bean & Adamson

(57) ABSTRACT

Apparatuses, methods, and systems are disclosed for transmitting and/or receiving an indication of feedback. One apparatus (200) includes a transmitter (210) that transmits (702) feedback information. The feedback information corresponds to first data. The apparatus (200) includes a receiver (212) that receives (704) a signal indicating whether the feedback information is received and receives (706) second data. The apparatus (200) includes a processor (202) that determines (708), based on the feedback information and the signal, whether the second data is a complete retransmission of the first data or a partial retransmission of the first data.

18 Claims, 7 Drawing Sheets

(51) Int. Cl.
*H04L 1/1829* (2023.01)
*H04L 5/00* (2006.01)
*H04W 72/21* (2023.01)
*H04N 1/32* (2006.01)
*H04N 21/426* (2011.01)

(52) U.S. Cl.
CPC .......... *H04L 1/1861* (2013.01); *H04L 5/0055* (2013.01); *H04W 48/12* (2013.01); *H04W 72/21* (2023.01); *H04N 1/32149* (2013.01); *H04N 21/42676* (2013.01)

(58) Field of Classification Search
CPC .............. H04L 5/0055; H04N 1/32149; H04N 21/42676; H04W 48/12; H04W 72/23; H04W 74/006
See application file for complete search history.

(56) References Cited

U.S. PATENT DOCUMENTS

| | | | | |
|---|---|---|---|---|
| 2004/0062267 | A1* | 4/2004 | Minami | H04L 29/06 370/463 |
| 2007/0114810 | A1* | 5/2007 | Yetukuri | B60N 2/856 296/65.01 |
| 2007/0127516 | A1* | 6/2007 | Czaja | H04L 5/0037 370/445 |
| 2008/0139113 | A1* | 6/2008 | Ho | H04L 1/1822 455/7 |
| 2008/0159509 | A1* | 7/2008 | Whitfield | H04M 3/564 379/32.01 |
| 2008/0253326 | A1* | 10/2008 | Damnjanovic | H04L 1/0006 370/329 |
| 2009/0077430 | A1 | 3/2009 | Cho et al. | |
| 2009/0086845 | A1* | 4/2009 | Demirhan | H04L 1/1812 375/295 |
| 2009/0122874 | A1* | 5/2009 | Kolze | H04H 20/69 375/240.24 |
| 2009/0196204 | A1* | 8/2009 | Astely | H04L 1/1896 370/280 |
| 2009/0303929 | A1* | 12/2009 | Yamamoto | H04J 11/00 370/328 |
| 2010/0002640 | A1* | 1/2010 | Gorokhov | H04L 1/1858 370/329 |
| 2010/0272042 | A1* | 10/2010 | Chun | H04L 1/0026 370/329 |
| 2012/0057451 | A1 | 3/2012 | Kim et al. | |
| 2013/0308612 | A1* | 11/2013 | Cai | H04L 1/0073 370/336 |
| 2016/0037414 | A1* | 2/2016 | Sivanadyan | H04W 76/10 370/331 |
| 2016/0233999 | A1* | 8/2016 | Chendamarai Kannan | H04L 1/1621 |
| 2017/0099664 | A1* | 4/2017 | Lunttila | H04L 1/1887 |
| 2017/0111091 | A1* | 4/2017 | Cao | H04L 5/0048 |
| 2017/0170686 | A1* | 6/2017 | Van Wageningen | H02J 50/60 |
| 2017/0215204 | A1* | 7/2017 | Sun | H04L 5/0055 |
| 2018/0006791 | A1* | 1/2018 | Marinier | H04L 1/1861 |
| 2018/0097606 | A1* | 4/2018 | Toledano | H04L 5/0055 |
| 2018/0175974 | A1* | 6/2018 | Wu | H04L 43/0864 |
| 2018/0255543 | A1* | 9/2018 | Takeda | H04W 72/0446 |
| 2018/0302144 | A1* | 10/2018 | Kazmi | H04W 28/065 |
| 2019/0020444 | A1* | 1/2019 | Fröberg | H04L 1/1854 |
| 2019/0181986 | A1* | 6/2019 | Kitamura | H04L 1/16 |
| 2020/0099496 | A1* | 3/2020 | Bi | H04L 5/1469 |

OTHER PUBLICATIONS

PCT/CN2017/077839, Notification of Transmittal of the International Search Report and the Written Opinion of the International Searching Authority, or the Declaration, PCT, dated Dec. 27, 2017, pp. 1-11.
Samsung, "CB-group based retransmission for eMBB", 3GPP TSG RAN WG1 Meeting #88 R1-1702990, Feb. 13-17, 2017, pp. 1-9.
CATT, "Discussion on HARQ enhancements for NR", 3GPP TSG RAN WG1 Meeting #88 R1-1702101, Feb. 13-17, 2017, pp. 1-3.
Potevio, "Discussion on partial retransmission for eMBB", 3GPP TSG RAN WG1 Meeting #88 R1-1703232, Feb. 13-17, 2017, pp. 1-4.
LG Electronics, "Discussion on scheduling and HARQ feedback for NR", 3GPP TSG RAN WG1 Meeting #88 R1-1702486, Feb. 13-17, 2017, pp. 1-8.
HTC, "Enhanced HARQ for NR", 3GPP TSG RAN WG1 Meeting #88 R1-1702372, Feb. 13-17, 2017, pp. 1-4.
Nokia et al., "Multi-bit feedback for NR HARQ operation", 3GPP TSG-RAN WG1 Meeting #88 R1-1703325, Feb. 13-17, 2017, pp. 1-5.
Intel Corporation, "Multi-bit HARQ Feedback per TB", 3GPP TSG RAN WG1 Meeting RAN1 #88 R1-1702237, Feb. 13-17, 2017, pp. 1-3.
Qualcomm Incorporated, "Multi-bit HARQ-ACK feedback", 3GPP TSG-RAN WG1 #88 R1-1702636, Feb. 13-17, 2017, pp. 1-9.
Interdigital Commiuications, "Multi-bits HARQ feedback", 3GPP TSG RAN WG1 Meeting #88 R1-1702379, Feb. 13-17, 2017, pp. 1-3.
3GPP, "3rd Generation Partnership Project; Technical Specification Group Radio Access Network; Evolved Universal Terrestrial Radio Access (E-UTRA); Multiplexing and channel coding (Release 15)", 3GPP TS 36.212 V15.2.1, Jul. 2018, pp. 1-245.
ZTE et al., "NR HARQ timing and feedback schemes", 3GPP TSG RAN WG1 Meeting #88 R1-1701593, Feb. 13-17, 2017, pp. 1-8.
Fraunhofer HHI, "On HARQ feedback schemes for NR", 3GPP TSG-RAN WG1#88 R1-1703309, Feb. 13-17, 2017, pp. 1-3.
Mediatek Inc. "On multiple HARQ bits per TB and feedback mechanism", 3GPP TSG RAN WG1 Meeting #88 R1-1702738, Feb. 13-17, 2017, pp. 1-4.
Fujitsu, "Support of multi bit HARQ-ACK feedback per TB", 3GPP TSG RAN WG1 Meeting #88 R1-1701919, Feb. 13-17, 2017, pp. 1-5.

* cited by examiner

INDICATION FOR HARQ-ACK FEEDBACK

FIELD

The subject matter disclosed herein relates generally to wireless communications and more particularly relates to an indication for HARQ-ACK feedback.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a high carrier frequency (e.g., >6 GHz) may be used, such as millimeter wave. In some networks, DL TBs may be carried on a PDSCH. In various configurations, a maximum of two TBs may be transmitted on a PDSCH in one serving cell and in one subframe. In such configurations, HARQ-ACK feedback bits corresponding to a PDSCH may be transmitted either on a PUCCH or on a PUSCH.

In some network configurations, an internal interleaver for turbo coding may have a limited number of code block sizes. In various configurations, the maximum code block size is 6144 in certain turbo decoders. In certain networks, if a transport block, including a transport block level cyclic redundancy check ("CRC"), has a bit length larger than the maximum code block size, then a procedure of code block segmentation may be applied before the bits are fed into a turbo coder. For code block segmentation, the transport block may be segmented into several code blocks so that each code block size is smaller or equal to a limit, and the size of each code block may match a set of specified code block sizes supported by a turbo encoder.

In certain network configurations, during the code block segmentation procedure, a code block level CRC of 24 bits may be calculated for and appended to each code block. Each code block may be decoded independently. The benefit of having a code block level CRC enables early detection of correctly decoded code blocks and correspondingly early stop of the iterative decoding of that code block. This may be used to reduce the terminal processing effort and corresponding energy consumption.

In some network configurations, for a transport block having multiple code blocks, if all the code blocks of the transport block are correctly decoded, the transport block may be seen as a correctly decoded TB and the corresponding HARQ-ACK feedback may be set to ACK; otherwise, the transport block may be seen as an incorrectly decoded TB and the corresponding HARQ-ACK feedback may be set to NACK even though there may be only one code block that is incorrectly decoded. If a NACK is reported from the receiver to the transmitter, the transmitter may retransmit the entire TB (e.g., all the code blocks of the TB) regardless of the successful decoding of some code blocks. This may lead to significant performance degradation due to a number of resources used for retransmission. In various configurations, more severe performance degradation may occur due to larger transport block sizes and burst interference when eMBB transmission is pre-empted by or collides with URLLC.

However, if one HARQ-ACK bit corresponds to one code block, too much feedback overhead may be used. To reduce HARQ-ACK feedback overhead, for one TB, multiple code blocks may be grouped into one code block group ("CBG") and a single bit HARQ-ACK feedback may be used to correspond to the code block group by performing HARQ-ACK bundling (e.g., logic AND operation) on the HARQ-ACK bits corresponding to each code block of the code block group. So, a number of resulting HARQ-ACK bits for one transport block may be equal to a number of code block groups. With a single HARQ-ACK bit feedback for each code block group, a successfully decoded code block group may not be retransmitted in the following HARQ retransmission because the code block group is already successfully decoded at the receiver side. Accordingly, certain retransmissions may use fewer resources and improve resource utilization efficiency.

In some configurations, a UE and a gNB may synchronize their knowledge of a used code block group size. For example, a code block group size may be dynamically indicated by a gNB to a UE via level 1 signaling from an RRC configured set of possible code block group sizes. Accordingly, a single HARQ-ACK bit per code block group may be generated and a number of HARQ-ACK bits may be adjusted flexibly. When using a single HARQ-ACK bit feedback for each code block group, a UE may not handle a retransmission correctly because the UE may not be aware of what is included in the retransmission.

BRIEF SUMMARY

Apparatuses for transmitting and/or receiving an indication of feedback are disclosed. Methods and systems also perform the functions of the apparatus. In one embodiment, the apparatus includes a transmitter that transmits feedback information. In such an embodiment, the feedback information may correspond to first data. In some embodiments, the apparatus includes a receiver that receives a signal indicating whether the feedback information is received and receives second data. In certain embodiments, the apparatus includes a processor that determines, based on the feedback information and the signal, whether the second data is a complete retransmission of the first data or a partial retransmission of the first data.

In one embodiment, the feedback information includes multiple bits. In a further embodiment, each bit of the multiple bits indicates a decoding result corresponding to a portion of the first data. In certain embodiments, the decoding result corresponding to a portion of the first data is an ACKNOWLEDGEMENT in response to the portion being correctly decoded and a NEGATIVE ACKNOWLEDGEMENT in response to the portion not being correctly decoded. In various embodiments, the first data includes multiple portions and each portion is independently decodable. In some embodiments, each portion of the first data is a code block. In one embodiment, each portion of the first data is a code block group and each code block in the code block group is independently decodable.

In certain embodiments, the signal indicating whether the feedback information is received includes one bit. In some embodiments, the signal indicating whether the feedback information is received is included in control signaling for scheduling transmission of the second data. In one embodiment, the processor determines that the second data is a complete retransmission of the first data in response to the signal indicating the feedback information is not received. In various embodiments, the processor determines that the second data is a complete retransmission of the first data in response to the signal indicating the feedback information is received and the feedback information indicating none of the portions of the first data is correctly decoded. In certain embodiments, the processor determines that the second data is a partial retransmission of the first data in response to the signal indicating the feedback information is received and the feedback information indicating at least one portion of the first data is correctly decoded.

A method for receiving an indication of feedback, in one embodiment, includes transmitting feedback information. In some embodiments, the feedback information corresponds to first data. In certain embodiments, the method includes receiving a signal indicating whether the feedback information is received. In some embodiments, the method includes receiving second data. In various embodiments, the method includes determining, based on the feedback information and the signal, whether the second data is a complete retransmission of the first data or a partial retransmission of the first data.

In one embodiment, an apparatus includes a transmitter that transmits a signal indicating whether feedback information is received. In some embodiments, the feedback information corresponds to first data. In various embodiments, the transmitter transmits second data based on the feedback information, wherein, based on whether the feedback information is received, the second data is a complete retransmission of the first data or a partial retransmission of the first data.

In one embodiment, the feedback information includes multiple bits. In a further embodiment, each bit of the multiple bits indicates a decoding result corresponding to a portion of the first data. In certain embodiments, the decoding result corresponding to a portion of the first data is an ACKNOWLEDGEMENT in response to the portion being correctly decoded and a NEGATIVE ACKNOWLEDGEMENT in response to the portion not being correctly decoded. In some embodiments, the first data includes multiple portions and each portion is independently decodable. In one embodiment, each portion of the first data is a code block.

In some embodiments, each portion of the first data is a code block group and each code block in the code block group is independently decodable. In certain embodiments, the signal indicating whether the feedback information is received includes one bit. In various embodiments, the signal indicating whether the feedback information is received is included in control signaling for scheduling transmission of the second data. In one embodiment, the second data is a complete retransmission of the first data in response to the feedback information not being received. In some embodiments, the second data is a complete retransmission of the first data in response to the feedback information being received and indicating none of the portions of the first data are correctly decoded. In certain embodiments, the second data is a retransmission of one or more incorrectly decoded portions of the first data in response to the feedback information being received and indicating that one or more corresponding portions of the first data are incorrectly decoded. In various embodiments, the signal indicates the feedback information is received in response to the feedback information being received. In one embodiment, the signal indicates the feedback information is not received in response to the feedback information not being received.

A method for transmitting an indication of feedback, in one embodiment, includes transmitting a signal indicating whether feedback information is received. In some embodiments, the feedback information corresponds to first data. In certain embodiments, the method includes transmitting second data based on the feedback information, wherein, based on whether the feedback information is received, the second data is a complete retransmission of the first data or a partial retransmission of the first data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
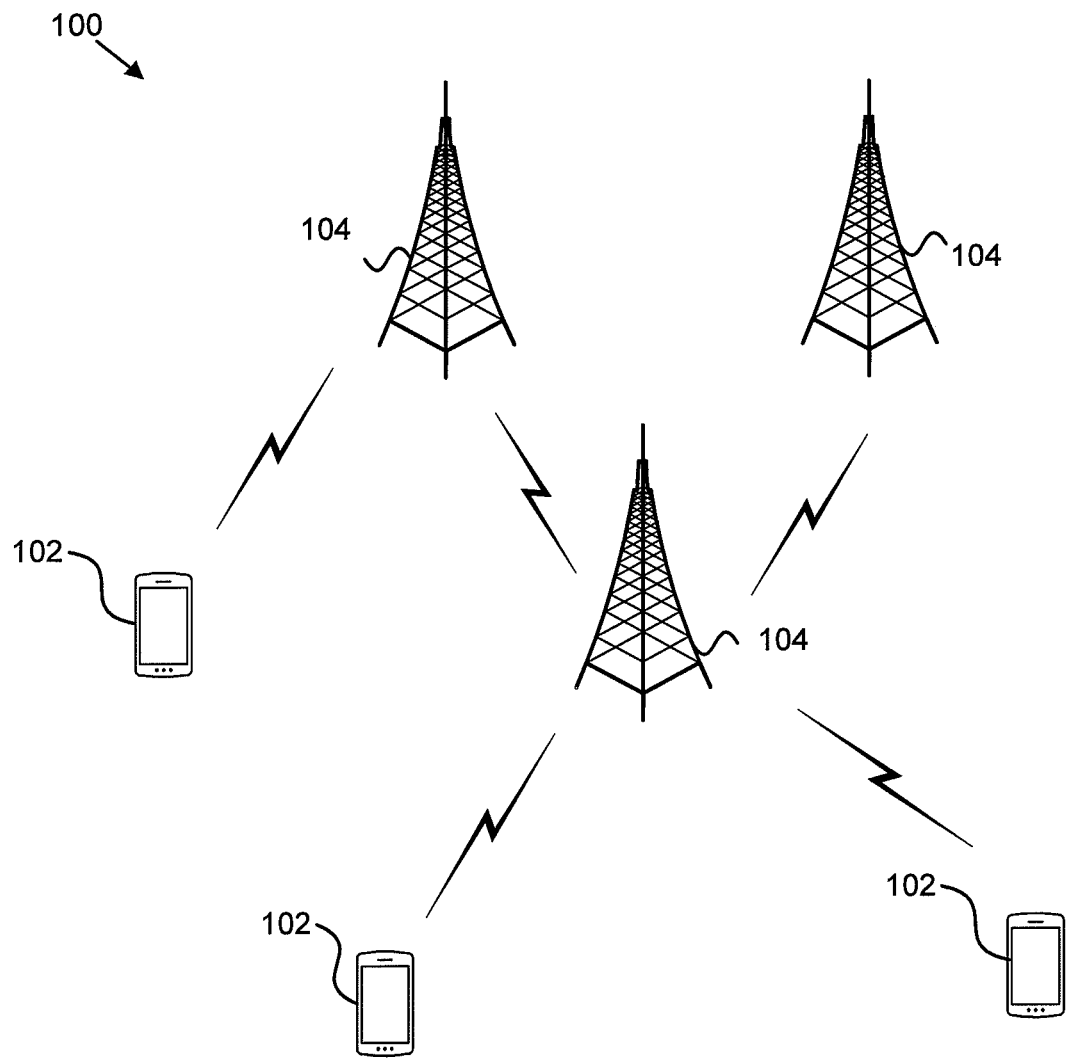
FIG. 1 is a schematic block diagram illustrating one embodiment of a wireless communication system for transmitting and/or receiving an indication of feedback.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving an indication of feedback. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may transmit feedback information to a base unit 104. In some embodiments, the feedback information corresponds to first data. In certain embodiments, the remote unit 102 may receive a signal indicating whether the feedback information is received by the base unit 104. In some embodiments, the remote unit 102 may receive second data. In various embodiments, the remote unit 102 may determine, based on the feedback information and the signal, whether the second data is a complete retransmission of the first data or a partial retransmission of the first data. Accordingly, a remote unit 102 may be used for receiving an indication of feedback.

In certain embodiments, a base unit 104 may transmit a signal indicating whether feedback information is received from a remote unit 102. In some embodiments, the feedback information corresponds to first data. In certain embodiments, the base unit 104 may transmit second data based on the feedback information, wherein, based on whether the feedback information is received, the second data is a complete retransmission of the first data or a partial retransmission of the first data. Accordingly, a base unit 104 may be used for transmitting an indication of feedback.

Figure 2:
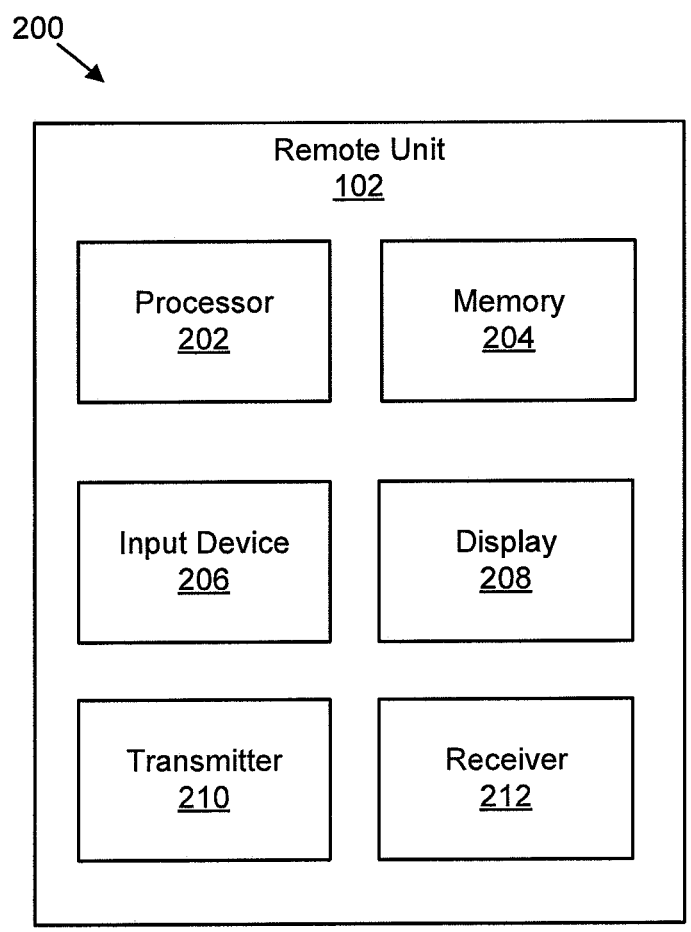
FIG. 2 is a schematic block diagram illustrating one embodiment of an apparatus that may be used for receiving an indication of feedback.

FIG. 2 depicts one embodiment of an apparatus 200 that may be used for receiving an indication of feedback. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines, based on feedback information and a signal (that indicates whether the feedback information was received by a base unit 104), whether second data is a complete retransmission of first data or a partial retransmission of the first data. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to feedback. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmits feedback information. In such embodiments, the feedback information may correspond to first data. In certain embodiments, the receiver 212 may be used to receive a signal indicating whether the feedback information is received and the receiver 212 may be used to receive second data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
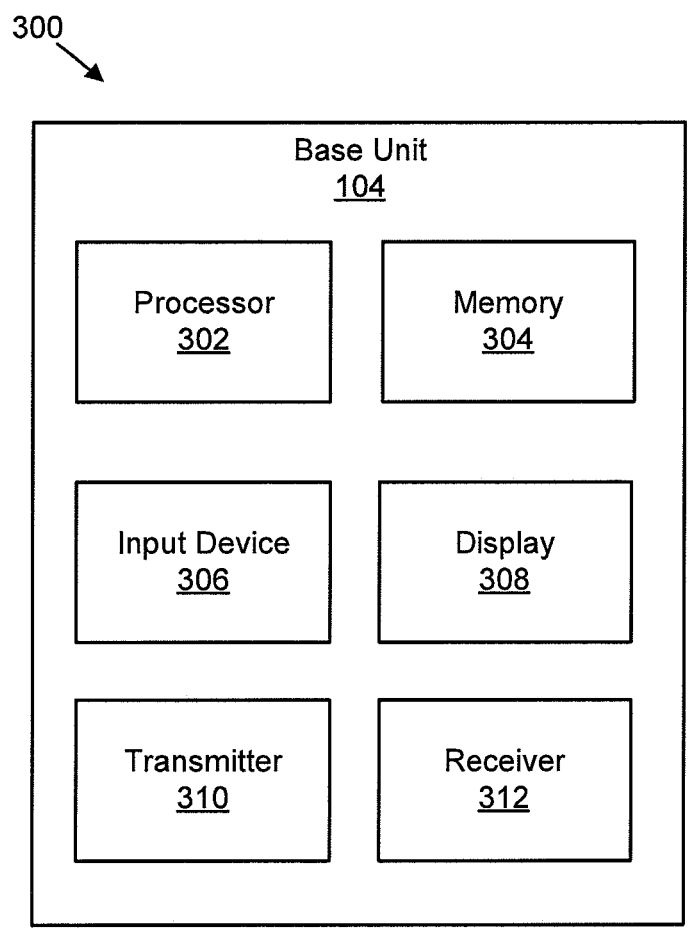
FIG. 3 is a schematic block diagram illustrating one embodiment of an apparatus that may be used for transmitting an indication of feedback.

FIG. 3 depicts one embodiment of an apparatus 300 that may be used for transmitting an indication of feedback. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit a signal indicating whether feedback information is received. In some embodiments, the feedback information corresponds to first data. In certain embodiments, the transmitter 310 is used to transmit second data based on the feedback information, wherein, based on whether the feedback information is received, the second data is a complete retransmission of the first data or a partial retransmission of the first data. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
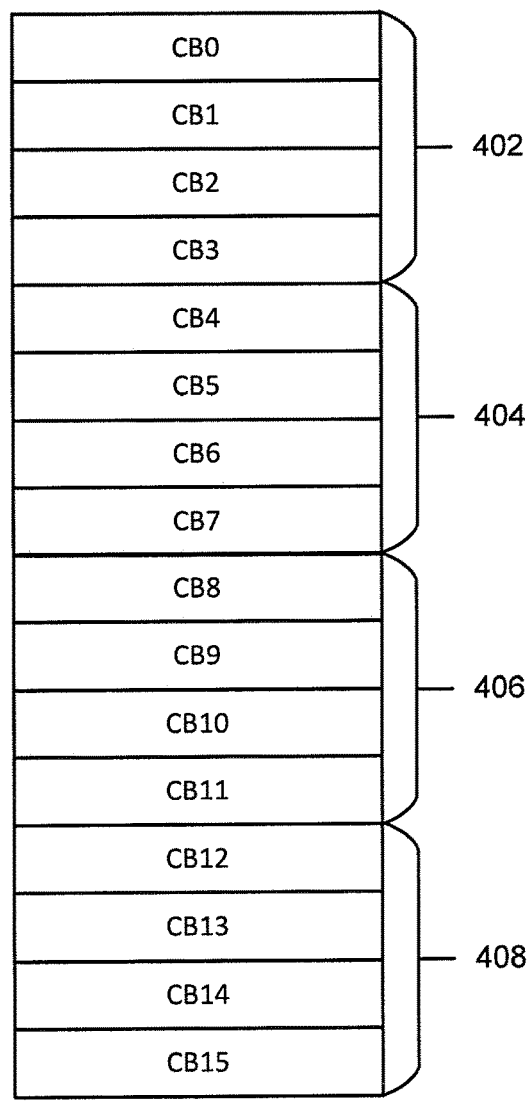
FIG. 4 illustrates one embodiment of a transport block.

FIG. 4 illustrates one embodiment of a transport block 400. The transport block 400 includes code blocks CB0, CB1, CB2, CB3, CB4, CB5, CB6, CB7, CB8, CB9, CB10, CB11, CB12, CB13, CB14, and CB15 (e.g., 16 code blocks). In certain embodiments, the code blocks CB0, CB1, CB2, CB3, CB4, CB5, CB6, CB7, CB8, CB9, CB10, CB11, CB12, CB13, CB14, and CB15 may be grouped into code block groups ("CBGs"). In some embodiments, a first code block group 402 includes CB0, CB1, CB2, and CB3, a second code block group 404 includes CB4, CB5, CB6, and CB7, a third code block group 406 includes CB8, CB9, CB10, and CB11, and a fourth code block group 408 includes CB12, CB13, CB14, and CB15.

Figure 5:
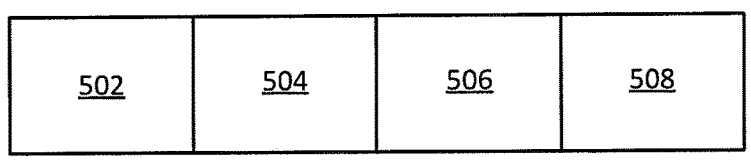
FIG. 5 illustrates one embodiment of feedback corresponding to a transport block.

In certain embodiments, to facilitate CBG-based transmission or retransmission, a base unit 104 and a remote unit 102 may synchronize a knowledge of a CBG size (e.g., a number of code blocks within one code block group). In some embodiments, the CBG size may be set to a minimum of one CB and a maximum of an entire TB. As illustrated in FIG. 4, the CBG size may be four CBs. Based on the knowledge of CBG size, a remote unit 102 may form the CBGs and generate a single HARQ-ACK bit for each CBG by HARQ-ACK bundling within the CBG as one example is illustrated in FIG. 5. In various embodiments, a number of resulting HARQ-ACK feedback bits for one TB may be equal to the number of code block groups. As illustrated in FIG. 4, every four consecutive code blocks form one code block group which is mapped to one HARQ-ACK bit as illustrated in FIG. 5.

FIG. 5 illustrates one embodiment of feedback 500 corresponding to a transport block. The feedback 500 includes four HARQ-ACK bits (e.g., a first bit 502, a second bit 504, a third bit 506, and a fourth bit 508). In certain embodiments, the first bit 502 corresponds to a first code block group (e.g., code block group 402), the second bit 504 corresponds to a second code block group (e.g., code block group 404), the third bit 506 corresponds to a third code block group (e.g., code block group 406), and the fourth bit 508 corresponds to a fourth code block group (e.g., code block group 408).

At a remote unit 102, after generating a HARQ-ACK bit corresponding to each CBG, the remote unit 102 may report the HARQ-ACK bits to a base unit 104. The HARQ-ACK bits may be reported in an ascending order of CBG index. In one example, the transport block 400 includes four code block groups as illustrated in FIG. 4 and, in this example, only the second code block group 404 is assumed to not correctly decoded at a remote unit 102, so the generated multiple HARQ-ACK feedback bits for the transport block 400 are: the first bit 502=ACK, the second bit 504=NACK, the third bit 506=ACK, and the fourth bit 508=ACK. Without any transmission error for HARQ-ACK bits (e.g., feedback 500) in uplink, a base unit 104 may receive such feedback information and only retransmit the failed second code block group 404 in a next transmission occasion with the same HARQ process ID. The second code block group 404 may be transmitted dependent on the same HARQ process ID and without a new data indicator ("NDI") toggled, therefore, the remote unit 102 may know the current transmission is a retransmission and aimed for the retransmission of the reported failed second code block group 404. Based on this transmission, the remote unit 102 may combine the current retransmitted second code block group 404 with the previously transmitted second code block group 404 for further decoding of the second code block group 404.

In certain embodiments, the UCI including the multiple HARQ-ACK bits may be missed by the base unit 104. The multiple HARQ-ACK bits may have a higher likelihood of being missed if the HARQ-ACK feedback is greater than one bit. In certain embodiments, if the HARQ-ACK feedback is missed, the base unit 104 may not know which CBGs are correctly decoded by the remote unit 102 and may assume the feedback is in a discontinuous reception ("DTX") state and suppose the entire TB is not correctly received. Consequently, the base unit 104 may retransmit all the CBGs (e.g., the entire TB) to the remote unit 102. At the remote unit 102, without any help from the base unit 104, the remote unit 102 may not be aware that a current retransmission is actually for the entire TB. So the remote unit 102 may suppose that only the failed CBGs are retransmitted and may therefore combine the current received CBGs with the previously failed CBGs. Accordingly, CGBs may get wrongly combined and therefore waste the retransmission opportunity. The failed CBGs are still failed and saved in the remote unit 102 soft buffer. Moreover, this may continue to happen in subsequent retransmissions. To be specific, because the remote unit 102 has failed to decode the retransmission and mistaken the actual retransmission of the entire TB for the retransmission of failed CBGs, it may feedback a NACK to the base unit 104 to request a next retransmission of the failed CBGs. However, the base unit 104 may regard the NACK as retransmission of all CBGs and may continue such retransmission of all CBGs. So the misunderstanding between the base unit 104 and the remote unit 102 may continue in a non-ending loop.

Using NDI may not solve this problem because it is used to indicate whether the current transmission is a new transmission or retransmission of a TB. NDI cannot differentiate a CBG-based retransmission. One embodiment may include introducing CBG-based NDI in DL grant for scheduling the retransmission of failed CBGs and in such an embodiment the number of signaling bits may be equal to the number of CBGs. However, such an embodiment may include too many signaling bits being introduced. However, an indication from the base unit 104 to the remote unit 102 may be used to indicate whether the base unit 104 received the HARQ-ACK feedback and therefore inform the remote unit 102 about what information it is receiving, as described in relation to FIG. 6.

Figure 6:
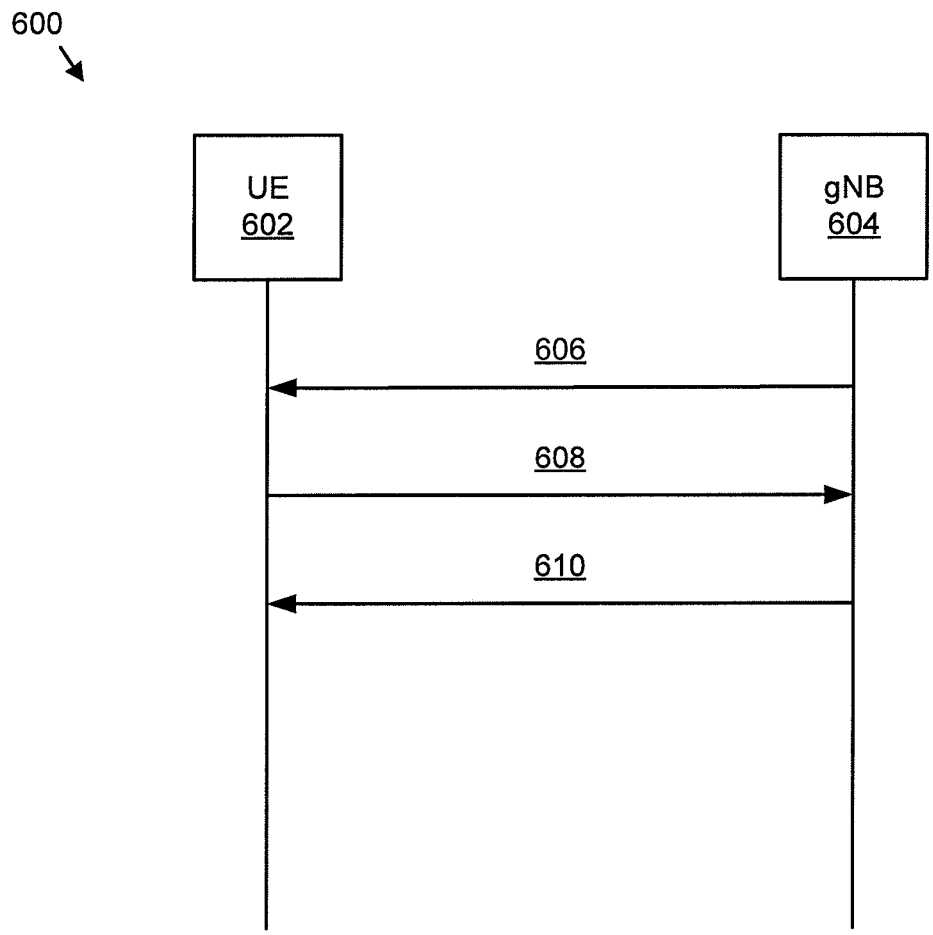
FIG. 6 illustrates one embodiment of communications for transmitting and/or receiving an indication of feedback.

FIG. 6 illustrates one embodiment of communications 600 for transmitting and/or receiving an indication of feedback. Specifically, communications 600 between a UE 602 and a gNB 604 are illustrated. In a first communication 606, the gNB 604 transmits first data to the UE 602. In a second communication 608, the UE 602 transmits feedback information to the gNB 404. The feedback information corresponds to the first data. In a third communication 610, the gNB 604 transmits a signal to the UE 602 indicating whether feedback information was received by the gNB 604. The third communication 610 may also include the gNB 604 transmitting second data to the UE 602 based on the feedback information. Thus, the UE 602 may know whether the gNB 604 received the feedback information and may know what is included in the second data. More information regarding the signal is provided below.

Specifically, to avoid a misunderstanding between the gNB 604 and the UE 602 about one or more retransmitted CBGs or an entire TB (e.g., second data), a HARQ-ACK feedback confirmation indication ("FCI") may be transmitted with a retransmission.

In certain embodiments, FCI may be a single-bit signal and may be contained in DL assignment for HARQ retransmission scheduling. One of two possible binary values of FCI (e.g., 0 or 1) may explicitly indicate that the gNB 604 has successfully received the HARQ-ACK feedback from the UE 602 and indicate that the current transmission is scheduled for retransmission of the failed CBGs (e.g., the CBGs corresponding to one or more HARQ-ACK bits reported as "NACK"). Correspondingly, the other value of FCI may explicitly indicate that the gNB 604 didn't receive the HARQ-ACK feedback and indicate that the current transmission is scheduled for retransmission of the entire TB or the CBGs in a latest transmission. In some embodiments, if a current transmission is a new transmission then the FCI bit may be reserved and ignored by the UE 602.

In various embodiments, upon detection of HARQ-ACK feedback, the gNB 604 may retransmit the CBGs in which one or more corresponding HARQ-ACK bits are reported as "NACK" and enable the FCI bit with NDI not toggled in an associated DL assignment. In certain embodiments, if HARQ-ACK feedback is missed, the gNB 604 may retransmit the entire TB or retransmit the CBGs in a latest transmission and disable the FCI bit with NDI not toggled in an associated DL assignment. In some embodiments, if a current transmission is a new transmission, then the NDI bit is toggled and the FCI bit is reserved.

In one embodiment, upon detection of a DL assignment, the UE 602 may first detect the NDI bit to determine whether a current transmission is a new transmission or retransmission (e.g., NDI bit toggled may indicate a new transmission and NDI bit not toggled may indicate a retransmission). If the current transmission is a new transmission, the UE 602 may ignore the FCI bit and start to decode the associated PDSCH channel. If the current transmission is a retransmission, the UE 602 may detect the FCI bit to determine whether it is enabled. If the FCI bit is enabled (e.g., set to a predefined value—0 or 1) it indicates that the gNB 604 has received the HARQ-ACK feedback from the UE 602 and that the current retransmission is scheduled only for CBGs with NACK reported by the UE 602. Therefore, the UE 602 may demodulate the associated PDSCH and combine the soft bits with the failed CBGs for further decoding. If the FCI bit is disabled (e.g., set to another predefined value—0 or 1) it indicates that the gNB 604 missed the HARQ-ACK feedback and that current retransmission is scheduled for retransmission of the entire TB or the CBGs in a latest transmission. Accordingly, the 602 UE may demodulate the associated PDSCH and combine the soft bits with previous received soft bits for the entire (e.g., complete) TB or CBGs in latest transmission.

For example, in an initial transmission with NDI toggled in DL assignment, assume that the associated TB consists of four CBGs and the second CBG is not correctly decoded, so the multiple HARQ-ACK bits for the four CBGs (e.g., ACK, NACK, ACK, ACK) are transmitted to the gNB 604. If the gNB 604 receives the feedback, the gNB 604 may retransmit the second CBG and enable the FCI bit with NDI not toggled in DL assignment for retransmission scheduling. If the gNB 604 missed the feedback, the gNB 604 may retransmit the entire TB and disable the FCI bit with NDI not toggled in DL assignment. At the UE 602, by detecting the FCI bit and the NDI bit, the UE 602 may know whether a current transmission is a retransmission and whether the retransmission is for the entire TB or just the failed second CBG. With this information indicating whether the gNB 604 received the HARQ-ACK feedback from the UE 602, the UE 602 clearly knows how to perform combining for further decoding.

Figure 7:
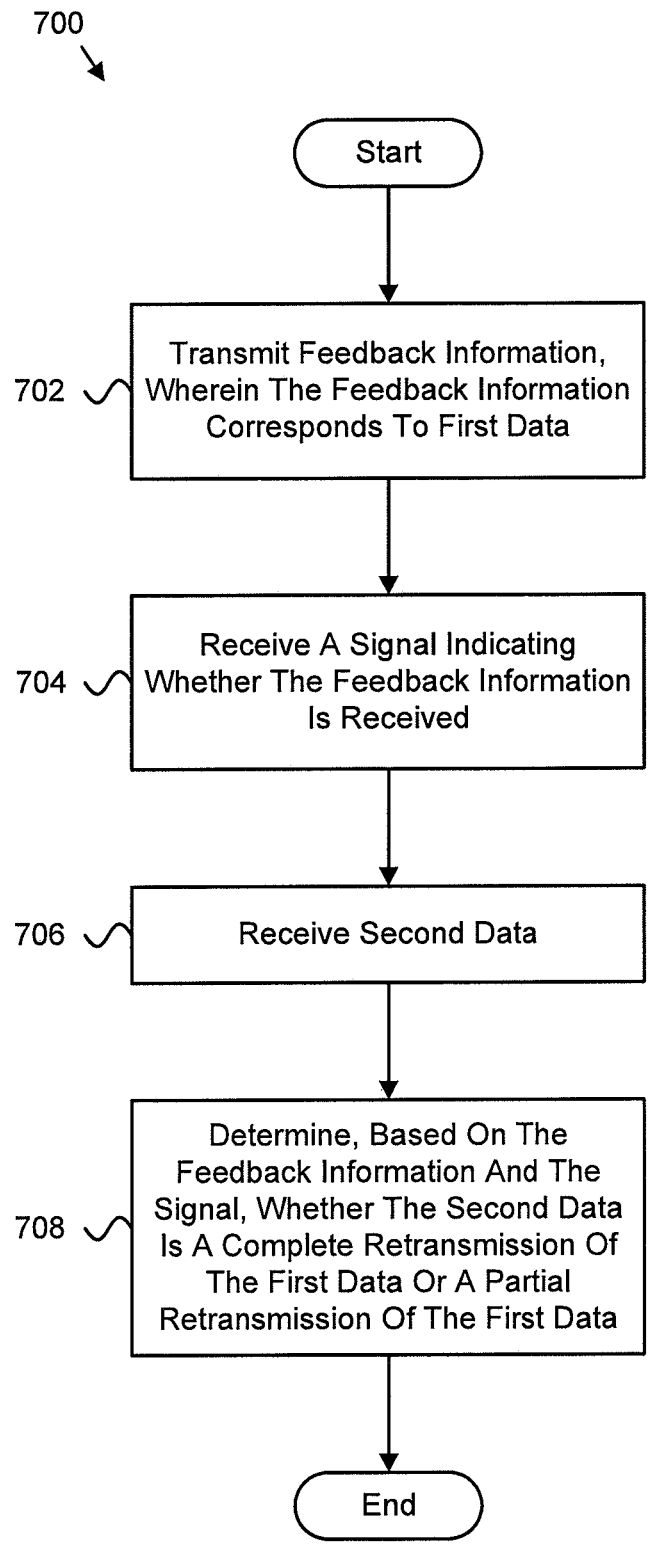
FIG. 7 is a schematic flow chart diagram illustrating one embodiment of a method for receiving an indication of feedback.

FIG. 7 is a schematic flow chart diagram illustrating one embodiment of a method 700 for receiving an indication of feedback. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 feedback information (e.g., to a base unit 104). In some embodiments, the feedback information corresponds to first data. In certain embodiments, the method 700 includes receiving 704 a signal indicating whether the feedback information is received (e.g., whether the feedback information is received by the base unit 104). In some embodiments, the method 700 includes receiving 706 second data. In various embodiments, the method 700 includes determining 708, based on the feedback information and the signal, whether the second data is a complete retransmission of the first data or a partial retransmission of the first data.

In one embodiment, the feedback information includes multiple bits. In a further embodiment, each bit of the multiple bits indicates a decoding result corresponding to a portion of the first data. In certain embodiments, the decoding result corresponding to a portion of the first data is an ACKNOWLEDGEMENT in response to the portion being correctly decoded and a NEGATIVE ACKNOWLEDGEMENT in response to the portion not being correctly decoded. In various embodiments, the first data includes multiple portions and each portion is independently decodable. In some embodiments, each portion of the first data is a code block. In one embodiment, each portion of the first data is a code block group and each code block in the code block group is independently decodable.

In certain embodiments, the signal indicating whether the feedback information is received includes one bit. In some embodiments, the signal indicating whether the feedback information is received is included in control signaling for scheduling transmission of the second data. In one embodiment, the method 700 includes determining that the second data is a complete retransmission of the first data in response to the signal indicating the feedback information is not received. In various embodiments, the method 700 includes determining that the second data is a complete retransmission of the first data in response to the signal indicating the feedback information is received and the feedback information indicating none of the portions of the first data is correctly decoded. In certain embodiments, the method 700 includes determining that the second data is a partial retransmission of the first data in response to the signal indicating the feedback information is received and the feedback information indicating at least one portion of the first data is correctly decoded.

Figure 8:
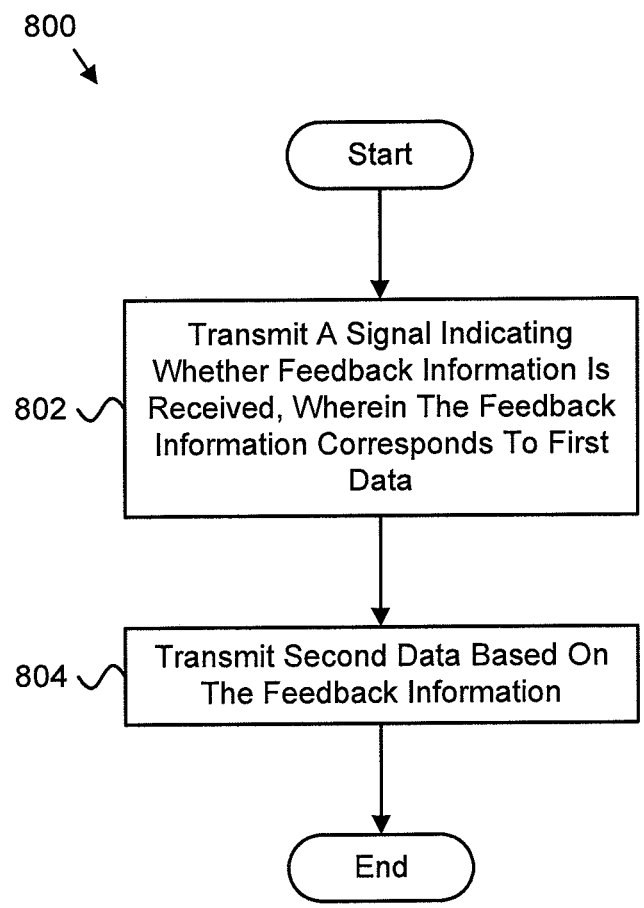
FIG. 8 is a schematic flow chart diagram illustrating one embodiment of a method for transmitting an indication of feedback.

FIG. 8 is a schematic flow chart diagram illustrating one embodiment of a method transmitting an indication of feedback. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 a signal indicating whether feedback information is received (e.g., by a base unit 104). In some embodiments, the feedback information corresponds to first data. The method 800 may also include transmitting 804 second data based on the feedback information, wherein, based on whether the feedback information is received, the second data is a complete retransmission of the first data or a partial retransmission of the first data.

In one embodiment, the feedback information includes multiple bits. In a further embodiment, each bit of the multiple bits indicates a decoding result corresponding to a portion of the first data. In certain embodiments, the decoding result corresponding to a portion of the first data is an ACKNOWLEDGEMENT in response to the portion being correctly decoded and a NEGATIVE ACKNOWLEDGEMENT in response to the portion not being correctly decoded. In some embodiments, the first data includes multiple portions and each portion is independently decodable. In one embodiment, each portion of the first data is a code block.

In some embodiments, each portion of the first data is a code block group and each code block in the code block group is independently decodable. In certain embodiments, the signal indicating whether the feedback information is received includes one bit. In various embodiments, the signal indicating whether the feedback information is received is included in control signaling for scheduling transmission of the second data. In one embodiment, the second data is a complete retransmission of the first data in response to the feedback information not being received. In some embodiments, the second data is a complete retransmission of the first data in response to the feedback information being received and indicating none of the portions of the first data are correctly decoded. In certain embodiments, the second data is a retransmission of one or more incorrectly decoded portions of the first data in response to the feedback information being received and indicating that one or more corresponding portions of the first data are incorrectly decoded. In various embodiments, the signal indicates the feedback information is received in response to the feedback information being received. In one embodiment, the signal indicates the feedback information is not received in response to the feedback information not being received.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment (UE), the apparatus further comprising:
a transmitter that transmits hybrid automatic repeat request (HARQ) feedback information to a base station, wherein the HARQ feedback information corresponds to first data, the HARQ feedback information comprises a plurality of bits, and each bit of the plurality of bits corresponds to at least one code block group;
a receiver that:
receives a confirmation indication to the HARQ feedback information from the base station, wherein the confirmation indication to the HARQ feedback information comprises a signal contained in DL assignment for HARQ retransmission scheduling indicating whether the plurality of bits of the HARQ feedback information were received by the base station, wherein the signal comprises a binary indicator that indicates only a first value or a second value, the first value indicates that the plurality of bits of the HARQ feedback information were received by the base station, and the second value indicates that the plurality of bits of the HARQ feedback information confirmation indication were not received by the base station; and
receives second data; and
receives a new data indicator bit that is not toggled indicating that the second data is a retransmission of data or is toggled indicating that the second data is a new transmission; and
a processor that
determines, based on the plurality of bits of the HARQ feedback information transmitted to the base station and the signal indicating whether the HARQ feedback information is received, whether the second data is a complete retransmission of the first data or a partial retransmission of the first data in response to the new data indicator bit being not toggled; and
ignores the plurality of bits of the HARQ feedback information were received by the base station and decodes an associated Physical Downlink Shared Channel in response to the new data indicator bit being toggled.

2. The apparatus of claim 1, wherein the processor determines that the second data is a complete retransmission of the first data in response to the signal indicating the HARQ feedback information is not received.

3. The apparatus of claim 1, wherein the processor determines that the second data is a complete retransmission of the first data in response to the signal indicating the HARQ feedback information is received and the HARQ feedback information indicating none of the portions of the first data is correctly decoded.

4. The apparatus of claim 1, wherein the processor determines that the second data is a partial retransmission of the first data in response to the signal indicating the HARQ feedback information is received and the HARQ feedback information indicating at least one portion of the first data is correctly decoded.

5. The apparatus of claim 1, wherein the processor combines the second data with the first data for decoding in response to the second data being a complete retransmission of the first data.

6. The apparatus of claim 1, wherein the processor combines the second data with one or more incorrectly decoded portions of the first data for further decoding in response to the second data being a partial retransmission of the first data.

7. A method in a user equipment (UE), the method comprising:
transmitting hybrid automatic repeat request (HARQ) feedback information to a base station, wherein the HARQ feedback information corresponds to first data, the HARQ feedback information comprises a plurality of bits, and each bit of the plurality of bits corresponds to at least one code block group;

receiving a confirmation indication to the HARQ feedback information from the base station, wherein the confirmation indication to the HARQ feedback information comprises a signal contained in DL assignment for HARQ retransmission scheduling indicating whether the plurality of bits of the HARQ feedback information were received by the base station, wherein the signal comprises a binary indicator that indicates only a first value or a second value, the first value indicates that the plurality of bits of the HARQ feedback information were received by the base station, and the second value indicates that the plurality of bits of the HARQ feedback information were not received by the base station;

receiving second data;

receiving a new data indicator bit that is not toggled indicating that the second data is a retransmission of data or is toggled indicating that the second data is a new transmission;

determining, based on the plurality of bits of the HARQ feedback information transmitted to the base station and the signal indicating whether the HARQ feedback information is received, whether the second data is a complete retransmission of the first data or a partial retransmission of the first data in response to the new data indicator bit being not toggled; and ignores the plurality of bits of the HARQ feedback information were received by the base station and decodes an associated Physical Downlink Shared Channel in response to the new data indicator bit being toggled.

8. The method of claim 7, wherein each bit of the plurality of bits indicates a decoding result corresponding to a portion of the first data.

9. The method of claim 8, wherein the decoding result corresponding to a portion of the first data is an ACKNOWLEDGEMENT in response to the portion being correctly decoded and a NEGATIVE ACKNOWLEDGEMENT in response to the portion not being correctly decoded.

10. The method of claim 7, wherein the first data comprises a plurality of portions and each portion is independently decodable.

11. The method of claim 10, wherein each portion of the first data is a code block.

12. The method of claim 10, wherein each portion of the first data is a code block group and each code block in the code block group is independently decodable.

13. The method of claim 7, wherein the signal indicating whether the HARQ feedback information is received comprises one bit.

14. The method of claim 7, wherein the signal indicating whether the HARQ feedback information is received is included in control signaling for scheduling transmission of the second data.

15. An apparatus comprising a base station, the apparatus further comprising:
a transmitter that:
transmits a confirmation indication to hybrid automatic repeat request (HARQ) feedback information to a user equipment (UE), wherein the confirmation indication to the HARQ feedback information comprises a signal contained in DL assignment for HARQ retransmission scheduling indicating whether plurality of bits of the HARQ feedback information were received by the base station, wherein the HARQ feedback information corresponds to first data, the HARQ feedback information comprises a plurality of bits, each bit of the plurality of bits corresponds to at least one code block group, the signal comprises a binary indicator that indicates only a first value or a second value, the first value indicates that the plurality of bits of the HARQ feedback information were received by the base station, and the second value indicates that the plurality of bits of the HARQ feedback information were not received by the base station;

transmits second data based on the HARQ feedback information to the user equipment, wherein, based on whether the HARQ feedback information is received, the second data is a complete retransmission of the first data or a partial retransmission of the first data, and the user equipment determines, based on the plurality of bits of the HARQ feedback information and the signal, whether the second data is the complete retransmission of the first data or the partial retransmission of the first data; and transmits a new data indicator bit that is not toggled indicating that the second data is a retransmission of data or is toggled indicating that the second data is a new transmission.

16. A method comprising:
transmitting, from a base station, a confirmation indication to hybrid automatic repeat request (HARQ) feedback information to a user equipment (UE), wherein the confirmation indication to the HARQ feedback information comprises a signal contained in DL assignment for HARQ retransmission scheduling indicating whether plurality of bits of the HARQ feedback information were received by the base station, wherein the HARQ feedback information corresponds to first data, the HARQ feedback information comprises a plurality of bits, each bit of the plurality of bits corresponds to at least one code block group, the signal comprises a binary indicator that indicates only a first value or a second value, the first value indicates that the plurality of bits of the HARQ feedback information were received by the base station, and the second value indicates that the plurality of bits of the HARQ feedback information were not received by the base station;

transmitting second data based on the HARQ feedback information to the user equipment, wherein, based on whether the HARQ feedback information is received, the second data is a complete retransmission of the first data or a partial retransmission of the first data, and the user equipment determines, based on the plurality of bits of the HARQ feedback information and the signal, whether the second data is the complete retransmission of the first data or the partial retransmission of the first data; and transmitting a new data indicator bit that is not toggled indicating that the second data is a retransmission of data or is toggled indicating that the second data is a new transmission.

17. The method of claim 16, wherein each bit of the plurality of bits indicates a decoding result corresponding to a portion of the first data.

18. The method of claim 17, wherein the decoding result corresponding to a portion of the first data is an ACKNOWLEDGEMENT in response to the portion being correctly decoded and a NEGATIVE ACKNOWLEDGEMENT in response to the portion not being correctly decoded.

\* \* \* \* \*